United States Patent
Siano et al.

(10) Patent No.: US 6,832,543 B2
(45) Date of Patent: Dec. 21, 2004

(54) MODULAR APPLIANCE SYSTEM

(75) Inventors: Salvatore R. Siano, Framingham, MA (US); Edward M. Jones, Stratford, CT (US); Justin C. Patterson, Milford, MA (US)

(73) Assignee: The Holmes Group, Inc., Milford, CT (US)

( * ) Notice: Subject to any disclaimer, the term of this patent is extended or adjusted under 35 U.S.C. 154(b) by 0 days.

(21) Appl. No.: 10/625,278

(22) Filed: Jul. 23, 2003

(65) Prior Publication Data

US 2004/0129809 A1 Jul. 8, 2004

Related U.S. Application Data

(60) Provisional application No. 60/397,923, filed on Jul. 23, 2002, and provisional application No. 60/430,563, filed on Dec. 3, 2002.

(51) Int. Cl.[7] .......................... A23N 1/02; A47J 43/046; A47J 43/06; A47J 43/07; A23L 1/00
(52) U.S. Cl. ............................ 99/340; 99/484; 99/492; 99/510; 241/37.5; 241/92; 241/101.01; 241/282.1; 366/129; 366/314
(58) Field of Search .................. 99/339, 340, 492–494, 99/509–513, 484; 366/205, 291, 297–300, 314, 129, 601, 130; 241/37.5, 92, 100, 101.01, 282.1, 282.2, 101.2; 248/605, 612, 634

(56) References Cited

U.S. PATENT DOCUMENTS

| | | | |
|---|---|---|---|
| 2,840,673 A | 6/1958 | Burton | |
| 3,947,909 A | 4/1976 | Kuo | |
| 4,575,255 A | 3/1986 | Kafka | |
| D291,767 S | 9/1987 | Osit | |
| 5,799,535 A | 9/1998 | Terry | |
| 5,875,706 A * | 3/1999 | Borger et al. | 99/492 |
| 6,170,108 B1 | 1/2001 | Knight | |
| 6,481,342 B2 * | 11/2002 | Thackray | 99/340 |
| 6,640,693 B2 * | 11/2003 | Brezovnik et al. | 99/348 |

* cited by examiner

Primary Examiner—Timothy F. Simone
(74) Attorney, Agent, or Firm—Hoffmann & Baron, LLP; Francis E. Marino

(57) ABSTRACT

A modular kitchen appliance system includes a base having a first receptacle and a second receptacle formed in a top surface of the base, at least a first motor contained within the base, a vessel supported in the first receptacle of the base and a hand-held appliance removably supported in the second receptacle of the base. The vessel includes a blade assembly adapted for coupling to the first motor and the hand-held appliance has a first end for receiving a shaft of an appliance attachment.

16 Claims, 17 Drawing Sheets

MODULAR APPLIANCE SYSTEM

CROSS-REFERENCE TO RELATED APPLICATION

This application claims the benefit of U.S. Provisional Patent Application No. 60/397,923 filed Jul. 23, 2002 and 60/430,563 filed Dec. 3, 2002, the disclosures of which are incorporated herein by reference.

FIELD OF THE INVENTION

The present invention generally relates to a kitchen appliance system, and more particularly to a modular appliance system that allows users to conduct a variety of kitchen tasks, such as food processing, coffee grinding, blending, mixing, juicing and/or pot scrubbing.

BACKGROUND OF THE INVENTION

At the present time, kitchens are generally well-equipped with modern appliances to improve the quality and efficiency of household work. Many modern day kitchen appliances have been developed to serve a variety of purposes. However, regardless of the size of the kitchen, the available countertop space that can accommodate a desired selection of kitchen appliances is always limited. Moreover, in most cases, the area suitable for food preparation is generally insufficient for even the simplest meals without relocating small appliances or clearing off additional space during intermediate stages of the cooking process. Thus, substantial benefits can be derived from compact kitchen appliances and whenever two or more conventional kitchen appliances, devices, tools, or aids are integrated to occupy a similar space.

Several appliances have been developed which attempt to minimize kitchen countertop space or to combine several kitchen tools in one appliance. For example, U.S. Pat. No. 3,947,909 to Kuo discloses a kitchen utility tool driven by a remote motor via a flexible drive shaft. The motor is mounted on a two-way swivel adjacent a kitchen workspace, such as a sink, for transmitting power from the motor to the rotary-driven kitchen implement, such as a sink brush or mixer blades. The device is collapsible and can be swiveled out of the way in a rest position.

U.S. Pat. No. 4,575,255 to Kafka discloses a modular kitchen appliance arrangement including a portable hand held unit which can be fitted with a selection of kitchen utensils, such as a whisk, a spatula and a mixer. The hand held unit is powered by batteries contained within the unit and which can be recharged by fitting the unit into a base when not in use. The base further includes receptacles for holding the various rotary driven kitchen utensils.

U.S. Pat. No. 5,799,535 to Terry discloses a kitchen appliance with a flexible drive shaft for driving one of a plurality of kitchen attachments. The flexible drive shaft delivers power from a remote motor and gear assembly to a portable hand held unit having the kitchen attachment. The motor and gear assembly is designed to be switchable between a rotary mode and an oscillating mode. The motor and gear assembly further includes a switch which can be remotely closed by activating a lever on the portable hand held unit.

Each of the above appliances relates solely to hand held appliances and are thus limited in their applications. Accordingly, it would be desirable to provide a compact kitchen appliance that is fully modular and adaptable to be used for a greater variety of purposes. In this regard, it would further be desirable to provide a modular kitchen appliance including both a base for stationary kitchen accessories, as well as a portable hand held unit connected to the base by a flexible drive for driving a plurality of attachments such that the appliance can be used for a greater plurality of tasks.

SUMMARY OF THE INVENTION

The present invention is a modular kitchen appliance system including a base having a first receptacle and a second receptacle formed in a top surface of the base, at least a first motor contained within the base, a vessel supported in the first receptacle of the base and a hand-held appliance removably supported in the second receptacle of the base. The vessel includes a blade assembly adapted for coupling to the first motor and the hand-held appliance has a first end for receiving a shaft of an appliance attachment.

In a preferred embodiment, the appliance system further includes a flexible drive cable defining a first end, a second end and a longitudinal axis. The second end of the cable is received by a second end of the hand-held appliance and is securable to the shaft of the appliance attachment for imparting a rotary motion to the appliance attachment. The first end of the flexible cable may be coupled to the first motor or it may be coupled to a second motor contained within the base. Either motor pivots the flexible drive cable with respect to its longitudinal axis thereby imparting the rotary motion to the appliance attachment.

The base further preferably includes a third receptacle formed in the top surface thereof for supporting the appliance attachment and an interior storage compartment for storing the flexible drive cable in a coiled retracted position. The storage compartment is preferably provided with a cable retraction mechanism, activated by a cable retraction button, for alternately feeding and retracting the flexible drive cable to desired lengths outside of the base. Additionally, the interior storage compartment preferably defines an opening in the base through which the flexible drive cable may be withdrawn and retracted. A wiper bushing is provided at the opening of the base for cleaning debris from the flexible drive cable during retraction of the cable into the interior storage compartment.

In an alternative preferred embodiment, the hand-held appliance includes a drive assembly contained therein for imparting the rotary motion to the appliance attachment. The hand-held appliance also includes a power source for powering the drive. The power source may include a battery that can be recharged by a battery charging circuit contained within the base when the appliance is supported in the second receptacle of the base.

A preferred form of the modular kitchen appliance system, as well as other embodiments, objects, features and advantages of this invention will be apparent from the following detailed description of illustrative embodiments thereof, which is to be read in conjunction with the accompanying drawings.

DETAILED DESCRIPTION OF THE PREFERRED EMBODIMENTS

Figure 1:
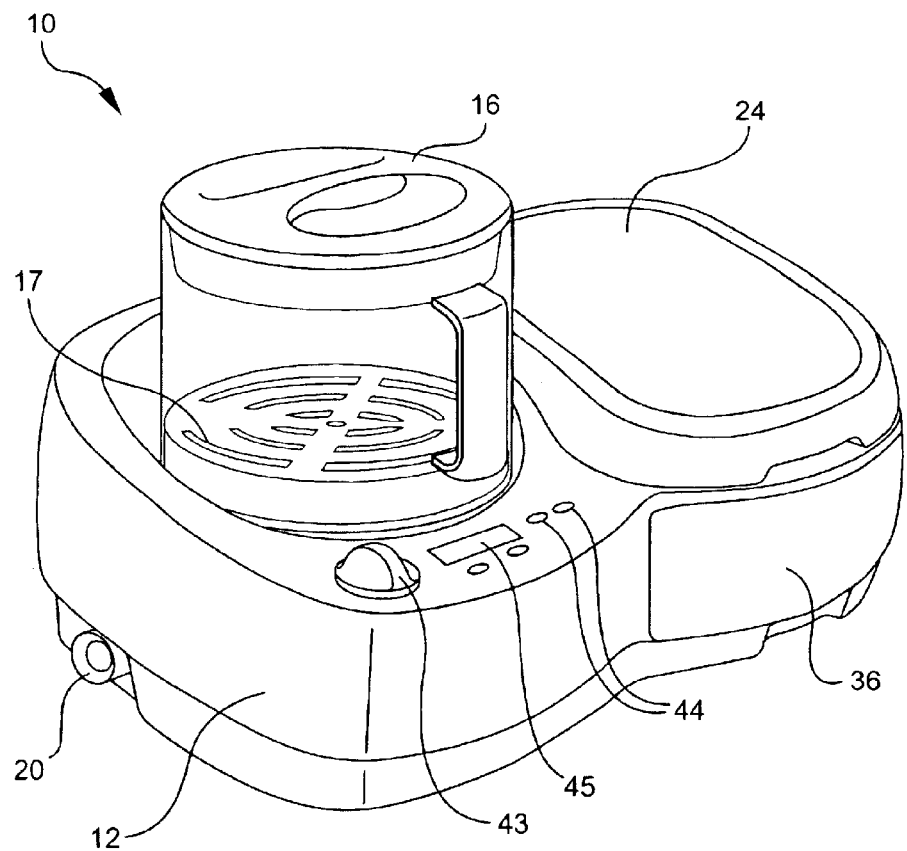
FIG. 1 is a top perspective view showing a modular appliance system in accordance with the invention.
Figure 2:
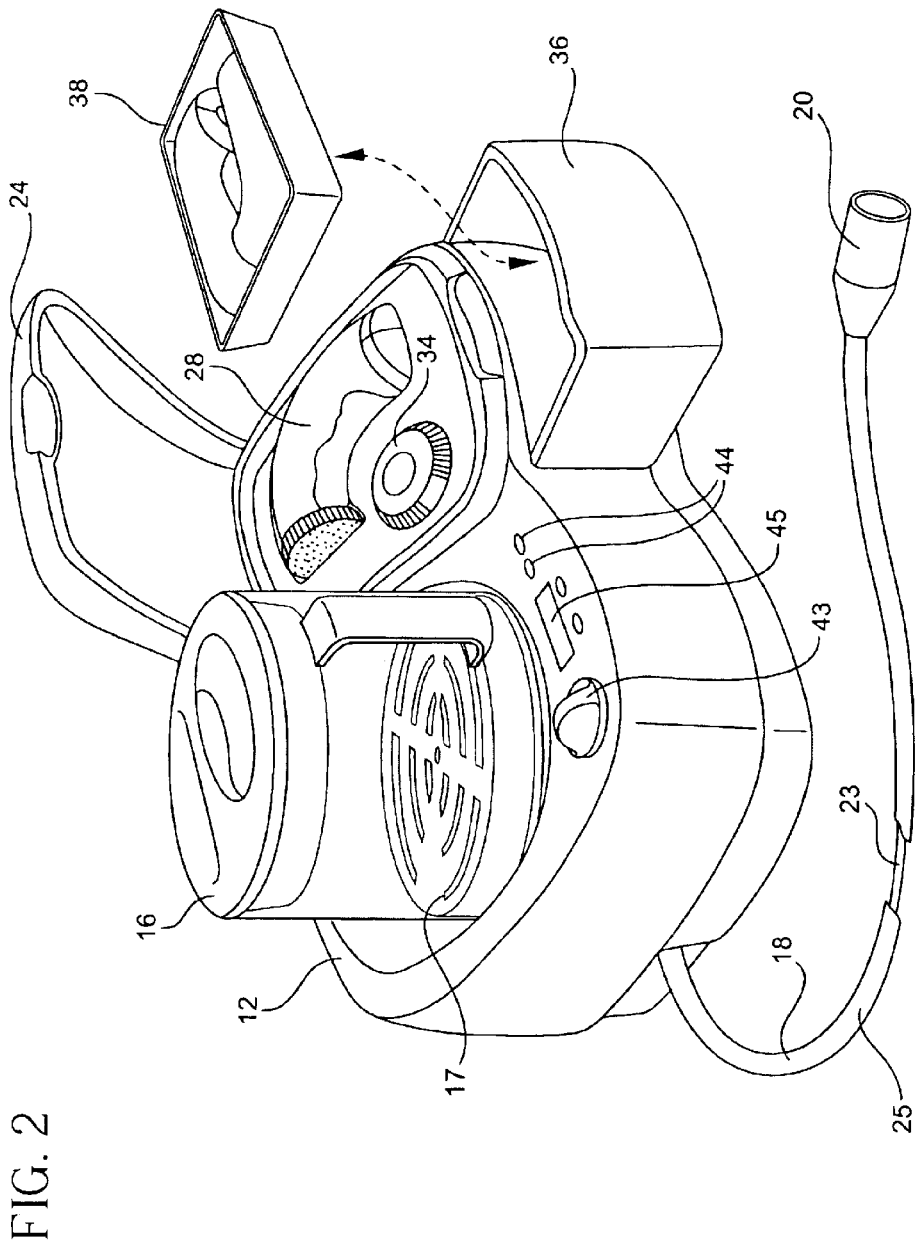
FIG. 2 is a top perspective view thereof showing several features of the invention as deployed.
Figure 3:
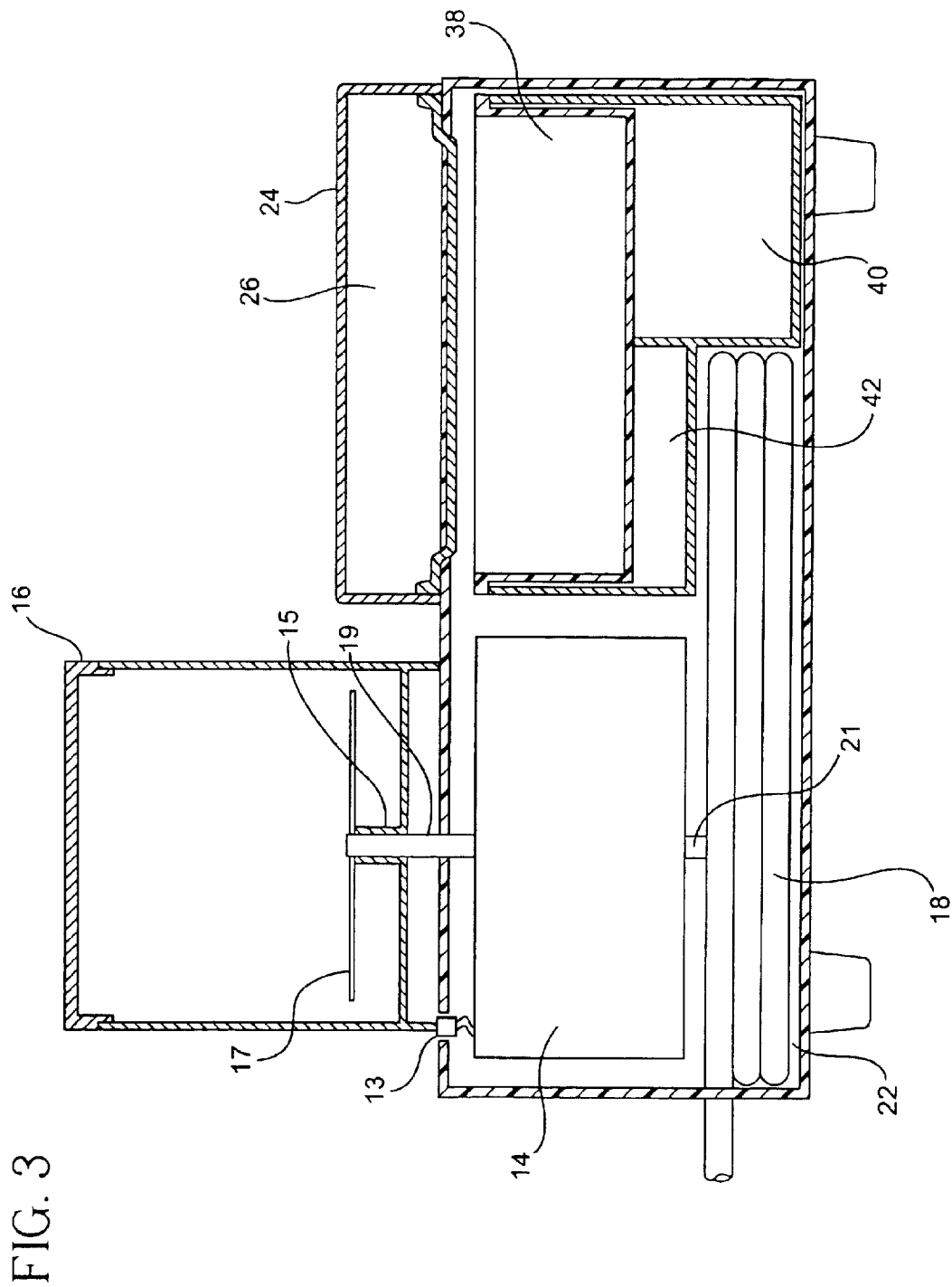
FIG. 3 is a schematical illustration of a modular appliance system similar to those shown in FIGS. 1 and 2.

A preferred embodiment of the invention is shown in FIGS. 1–3. The system 10 depicted therein includes a base 12 having a motor 14 contained within the base for driving various accessories and one or more compartments for storage. The system shown in FIGS. 1–3 uses a single motor for selectively driving all accessories designed for use with the system. However, as will be described in further detail below with respect to an alternative embodiment of the present invention, two motors can also be utilized. In either embodiment, the motor or motors are preferably speed controlled.

The upper surface of the base 12 is adapted for supporting a vessel 16 such as that shown in FIGS. 1–2. While the vessel shown in FIGS. 1–2 is intended for grinding coffee, the same surface of the base could alternatively be used to support other stationary appliance vessels, such as a blender jar or food processor. The vessel 16 includes therein an associated blade assembly 17 for grinding, blending, mixing, etc. the contents of the vessel 16. A switch 13, which can engage the vessel 16, may be included on base 12 to prevent energizing of motor 14 unless vessel 16 is properly in position, as shown in FIG. 3.

The system allows the motor 14 to directly drive the blade assembly 17 in the vessel 16. In this regard, the vessel 16 is positioned above the motor 14 in the base 12 and includes an opening 15 for access to the blade assembly 17. A coupling 19 is located near the top surface of the base 12, which extends through the vessel opening 15 for engaging the blade assembly 17. The coupling 19 rotates upon operation of the motor 14, thereby driving the blades of the blade assembly 17.

A flex shaft drive cable 18 having an accessory coupling 20 is also provided with the system. The flex shaft drive cable includes a flexible and rotatable shaft 23 encased in a protective sheath 25. A storage compartment 22 is located beneath the motor 14 for storing the drive cable 18 in the base 12. The drive cable 18 can be coupled between a second motor coupling 21 of the motor 14 and an appliance, such as a scrubber or immersion blender. The motor 14 rotates the coupling 21, thereby rotating the shaft 23 of the cable 18. The cable 18 can, accordingly, impart rotary motion to the drive shaft of such an appliance.

The drive cable 18 can be retractable within the compartment 22 for storage or it can be detachable from the base 12. If detachable, the storage compartment 22 for the drive cable 18 would require access means, such as a door, opening or drawer so that it could be easily removed by the user and coupled to an output of the motor.

While the system 10 can be constructed such that the blade assembly 17 in the vessel 16 and an accessory attached to the accessory coupling 20 at the end of the drive cable 18 can be operated simultaneously, the preferred embodiment allows only one to be operated at a given time. An indexing device is accordingly provided for disengaging one of the blade assembly coupling 19 or the cable coupling 21 of the motor 14 so that the blade assembly 17 or the accessory is deactivated from the motor when the other of these elements is operated. This may be achieved by moving motor 14 between a first and second position. A switch 43 may be provided on the base 12 to actuate the indexing device, thereby allowing the user to operate only one accessory at any one time. It is also within the contemplation of the present invention that the indexing could be achieve through the use of gears and/or clutch assemblies, which selectively engage and rotate the blade assembly or the drive cable.

Figure 4:
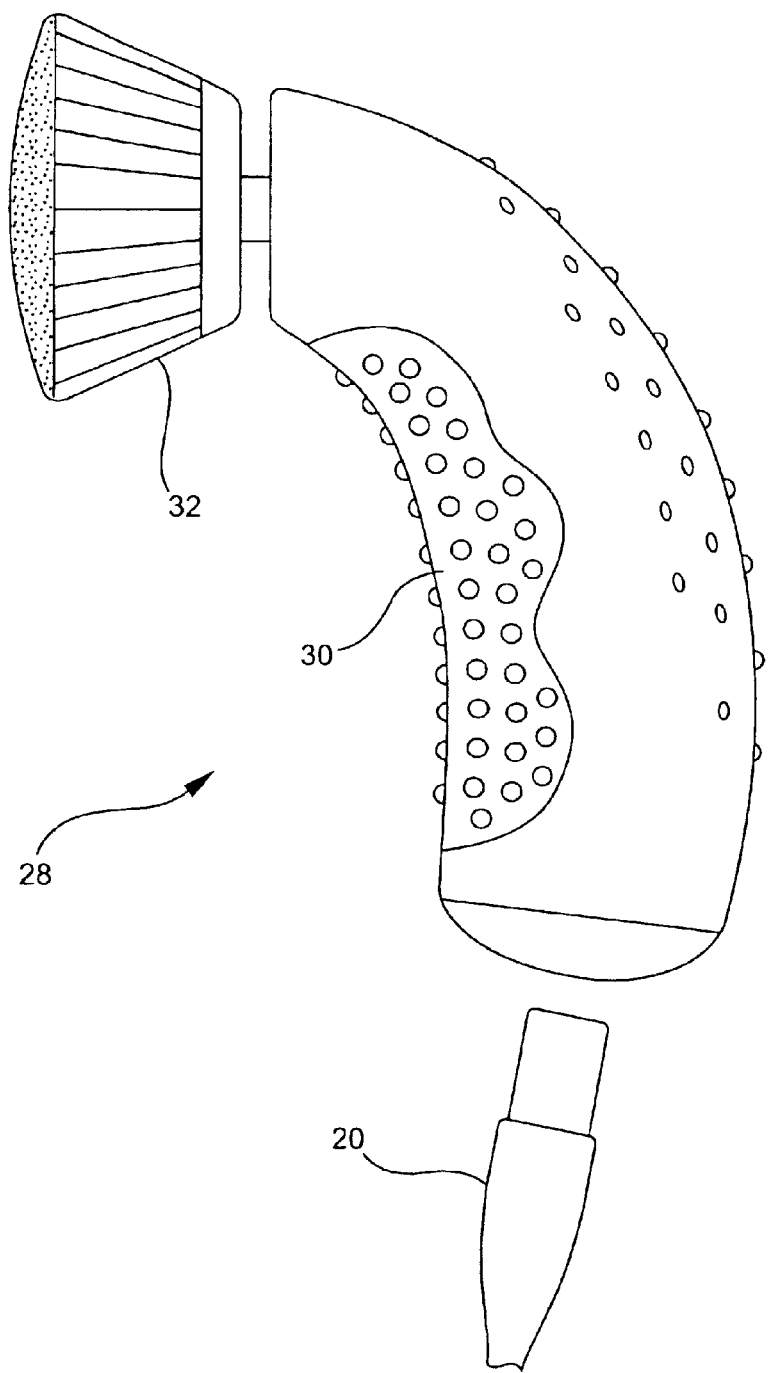
FIG. 4 is a side elevation view of a scrubber designed for coupling with a flexible shaft drive cable.

The base 12 includes additional storage features that can be used to store accessories or other items. A lid 24 is pivotably coupled to the base 12 and provides access to a top compartment 26. A scrub brush 28 is shown within this compartment 26. Referring additionally to FIG. 4, the scrub brush 28 includes a handle 30 and an attached brush 32. The handle 30 is designed for connection to the coupling 20 at the output end of the drive cable. The brush 32 is rotatable with respect to the handle 30. A spare brush 34 is also located in this compartment 26.

A drawer 36 is provided beneath the top compartment 26. The drawer 36 can be pulled out to access its contents. A lift-out tray 38 may be positioned within the drawer. Additional compartments 40, 42 can be provided beneath the drawer 36.

Appliances designed for coupling to the drive cable 18 are shown in FIGS. 4–8. Preferably, all internal components of all the appliances are sufficiently sealed so that the appliances are dishwasher safe. Referring to FIG. 4, a scrub brush 28 includes a handle 30 that is connectable to the coupling 20 at the output end of the drive cable 18. The brush 32 is rotated when the user causes the flexible shaft within the drive cable to be driven by the motor 14. A non-slip material is preferably provided on the handle. Bumps may be incorporated in this material for facilitating gripping.

Figure 5B:
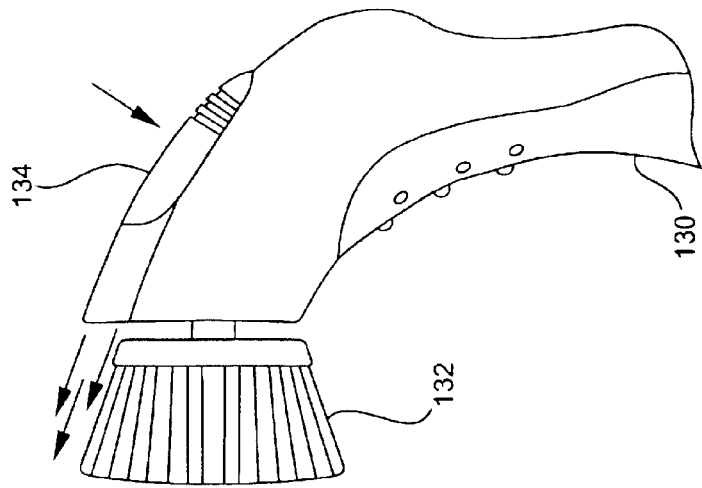
FIG. 5 includes perspective and side elevation views of a scrubber with controls for releasing liquid dish soap.
Figure 5A:
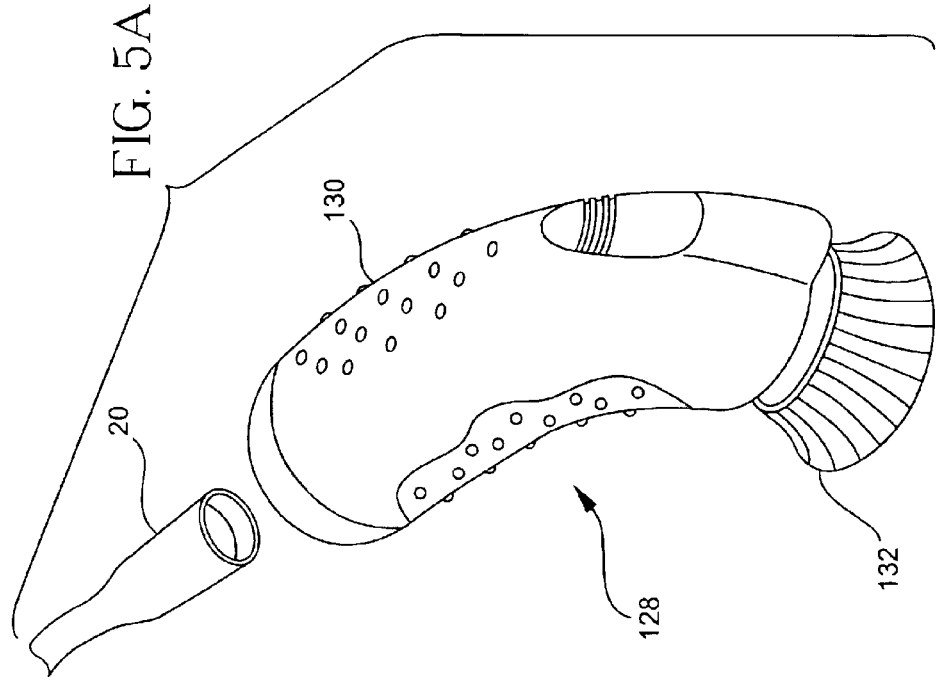

FIG. 5 shows a scrub brush 128 similar to that shown in FIG. 4. It also includes a handle 130 and brush 132. The handle may further include a reservoir (not shown) for soap, and a button 134 to control release of the soap.

Figure 6:
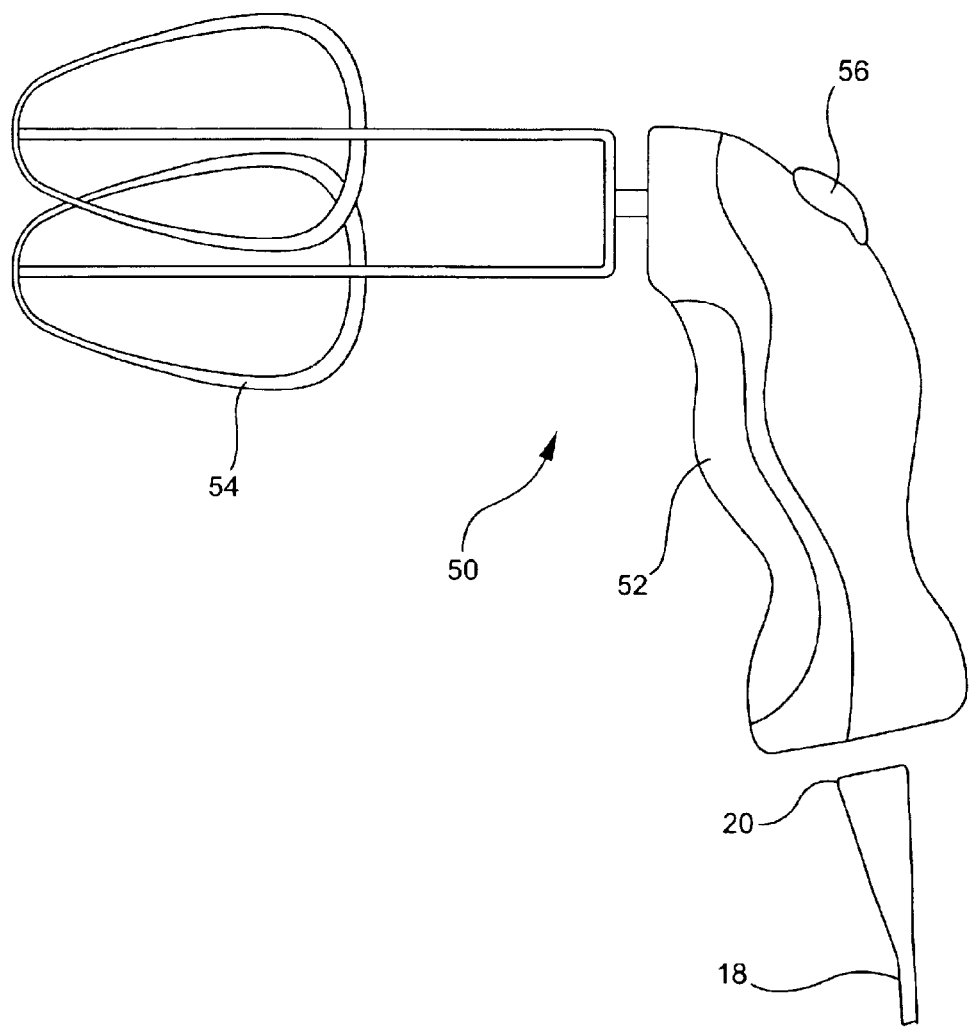
FIG. 6 is a side elevation view of a beater/mixer designed for coupling to a flexible shaft drive cable.

A beater/mixer assembly 50 is shown in FIG. 6. The assembly includes a handle 52 having a base portion adapted for connection to the coupling 20 at the output end of the drive cable 18 and a beater/mixer attachment 54 removably attached to the handle. A button 56 is provided on the handle 52 for releasing a locking mechanism (not shown) that locks the beater/mixer attachment 54 to the handle. Rotation of the flexible shaft of the drive cable 18 causes rotation of the beater/mixer attachment 54.

Figure 7:
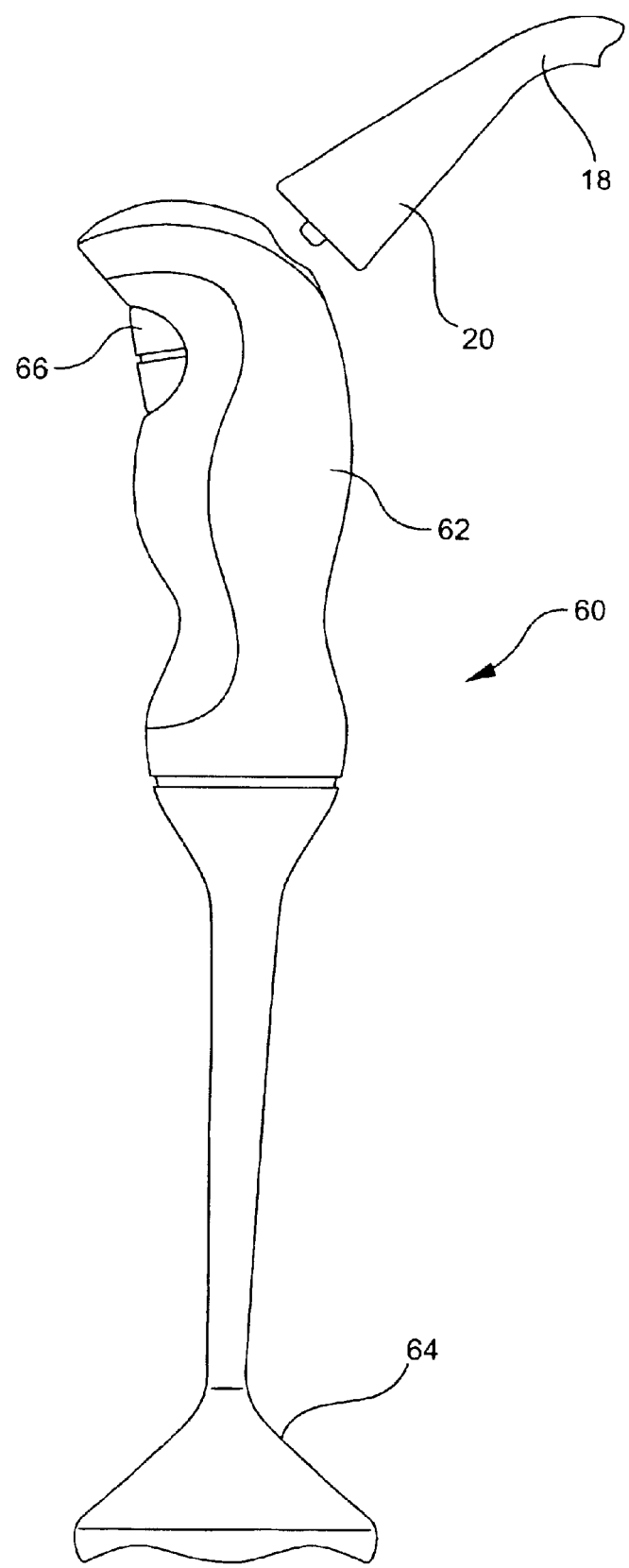
FIG. 7 is a side elevation view of an immersion blender designed for coupling to a flexible shaft drive cable.

An immersion blender 60 comprising a handle 62 and a blender accessory 64 attached thereto is shown in FIG. 7. The blender accessory 64 may be in the form of a beater blade, whisk blade, or other such device. The handle 62 of the blender 60 is adapted for connection to the coupling 20 at the output end of the drive cable 18. One or more control buttons 66 may be provided in the handle 62 for locking/unlocking the accessory 64 from the handle, and/or for momentarily activating or terminating power to the accessory.

Figure 8:
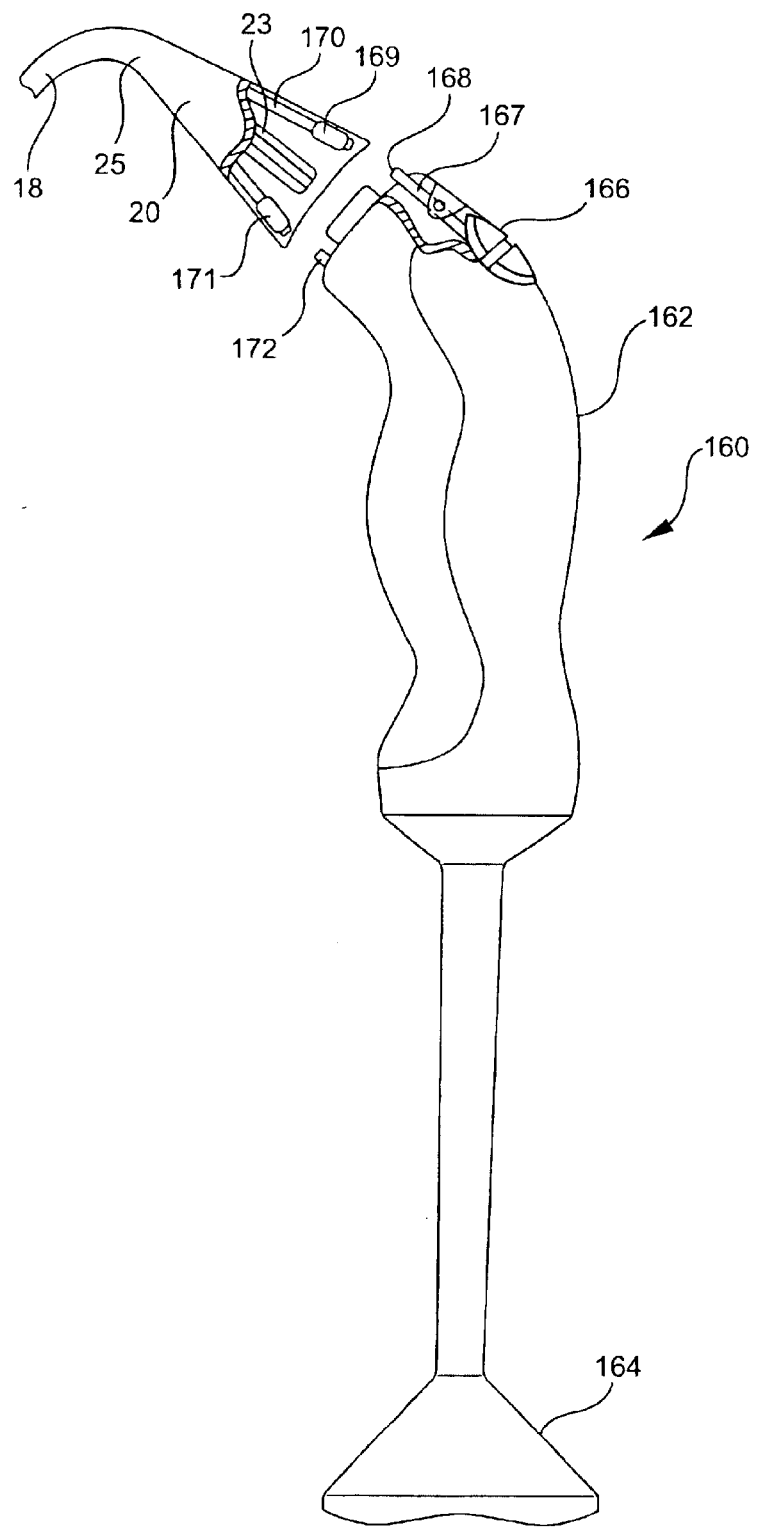
FIG. 8 is a side elevation view showing a second embodiment of an immersion blender designed for coupling to a flexible shaft drive cable.

A second embodiment of an immersion blender 160 is shown in FIG. 8. The handle 162 of this blender is adapted for connection to the coupling 20 at its proximal end. The accessory 164 is coupled to the handle 162 and adapted for rotation by means of the drive cable 18. One or more thumb control buttons 166, as described above, is positioned near the proximal end of the handle 162. Non-slip material is provided in the handle portion designed for a person's fingers.

FIG. 8 also illustrates the mechanism for momentarily activating or terminating power to the accessory. One thumb control button 166 of the accessory 160 is connected to a mechanical link or lever assembly 167 contained within the proximal end of the handle 162. The link assembly 167 includes an engagement finger 168 which extends outwardly from the proximal end of the handle 162. The engagement finger 168 of the link assembly 167 is designed to engage an electrical microswitch 169 contained within the coupling 20 of the flexible drive cable 18. The microswitch 169 is electrically connected to the motor 14 contained within the base 12 by a wire 170 running alongside the cable shaft 23 inside the cable sheath 25 of the drive cable 18. Thus, activation of the thumb control button 166 causes the mechanical link 167 to alternately engage and disengage the microswitch 169 of the drive cable 18, which in turn activates or terminates power to the motor 14 within the base 12.

Similarly, in order to prevent rotation of the drive shaft 23 of the drive cable 18 when an appliance is not attached, a safety microswitch 171 may be included in the accessory coupling 20 of drive cable 18. This switch 171 would only be actuated when an appliance is properly attached to the cable accessory coupling 20. In this regard, each appliance may include a button 172 which engages the safety switch 171 when an appliance is attached to the drive cable 18. Again, the switch 171 is electrically connected to the motor 14 rotating the drive cable such that power to the motor would be interrupted unless an appliance is attached.

It will be appreciated that the two outputs of the modular appliance system can be used for driving accessories other than those discussed above. For example, it is contemplated that the present invention can utilize other hand-held appliances driven by the drive cable such as, a can opener, a reciprocating knife, a drink mixer, a whisk, a cheese grater, a peeler, scissors, etc. Additionally, instead of a coffee grinder or food processor vessel attached to the base, the present invention may include such appliances as a citrus juicer, countertop blender, juice extractor, stand mixer, knife/scissors sharpener, etc.

Figure 9:
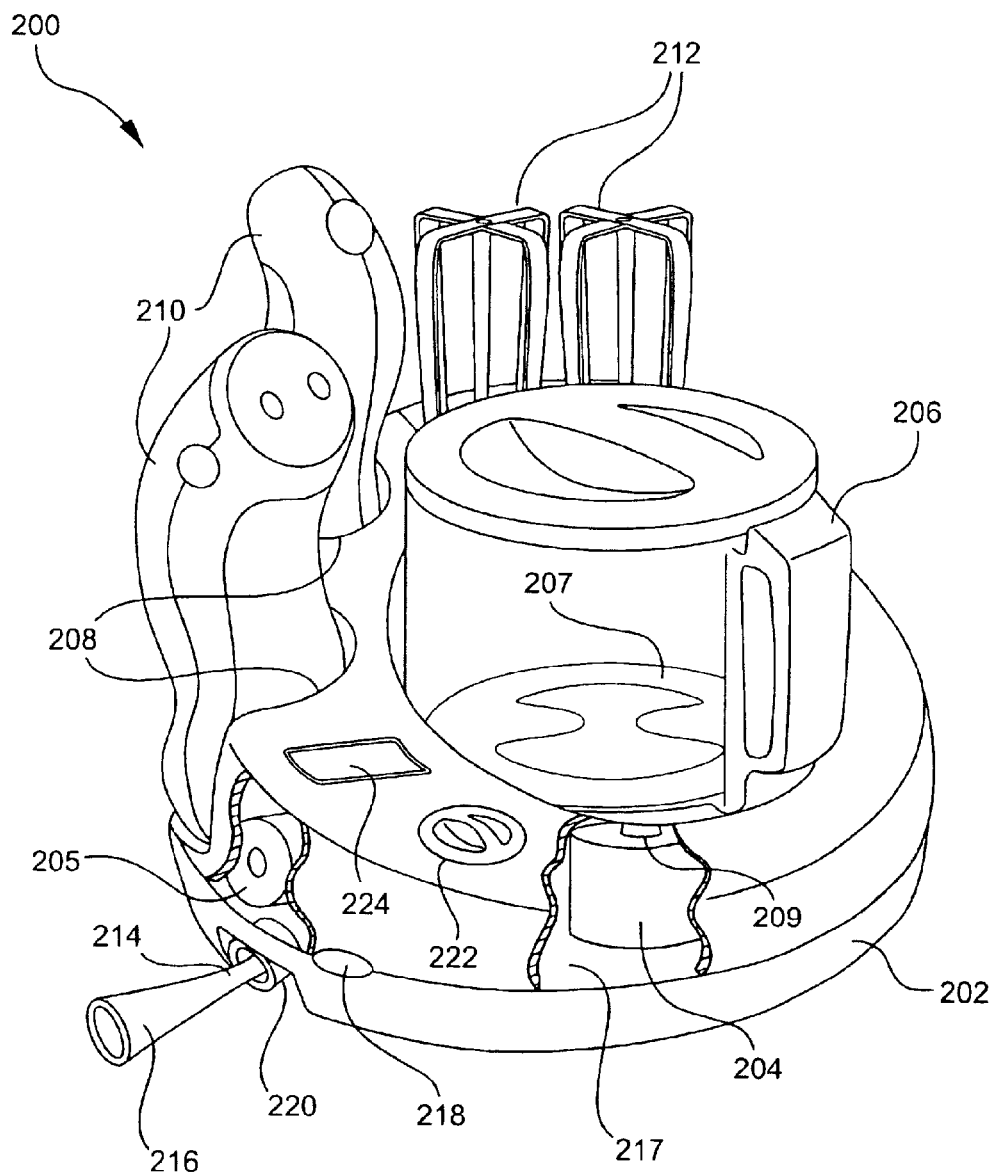
FIG. 9 is a top perspective view showing a modular appliance system in accordance with an alternative embodiment of the invention.
Figure 10:
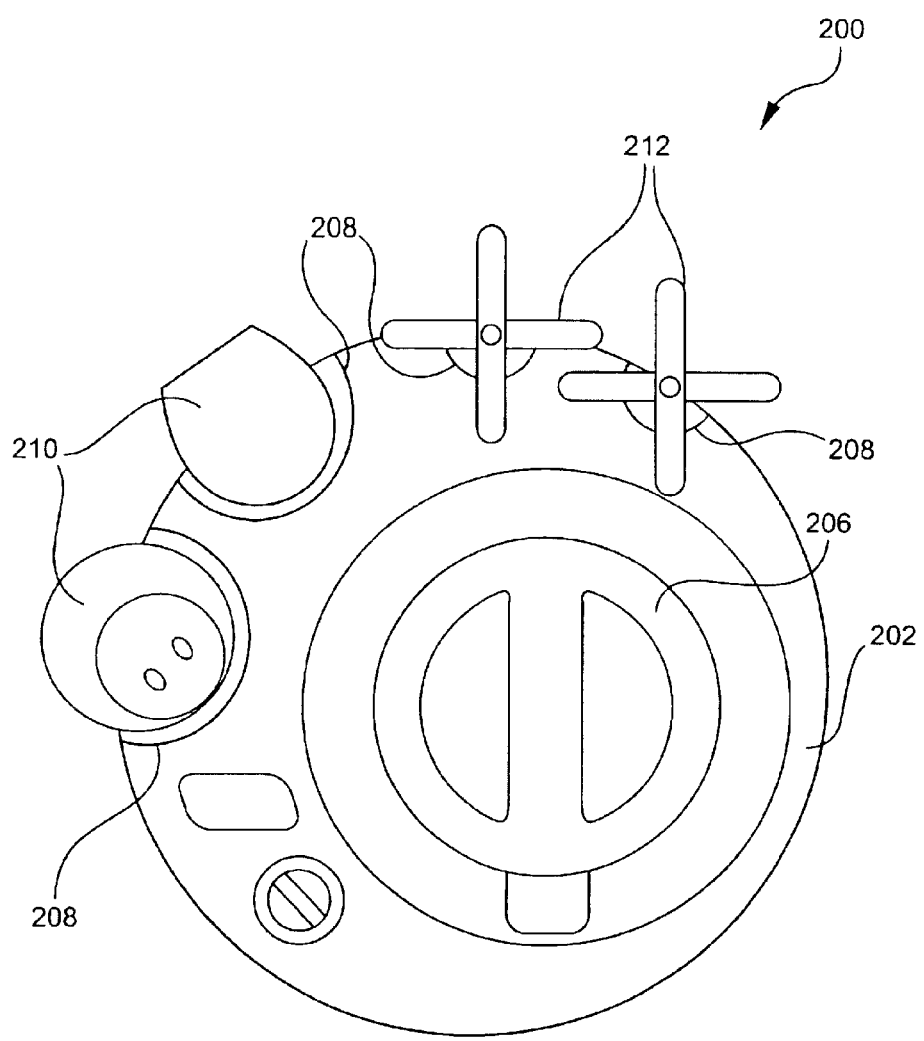
FIG. 10 is a top elevation view of the system shown in FIG. 9.

FIGS. 9 and 10 show an alternative embodiment of a modular appliance system 200 formed in accordance with the present invention. Like the system 10 described above, the modular appliance system 200 shown in FIGS. 9 and 10 includes a base 202 having an upper surface adapted for supporting a vessel 206. Again, the vessel 206, including a blade assembly 207, can be in the form of a coffee grinder, a blender jar, a food processor, etc.

However, unlike the system 10 described above, the base 202 further includes one or more receptacles or slots 208 formed in its upper surface around the vessel 206 for storing one or more hand-held appliances 210 and/or one or more appliance attachments 212. The slots 208 are preferably formed around the perimeter of the base 202 and are designed to hold the one or more appliances 210 and/or attachments 212 in an upright, readily accessible, orientation. The slots 208 can be provided as an alternative or in addition to the interior storage compartments of the base described above.

Figure 11A:
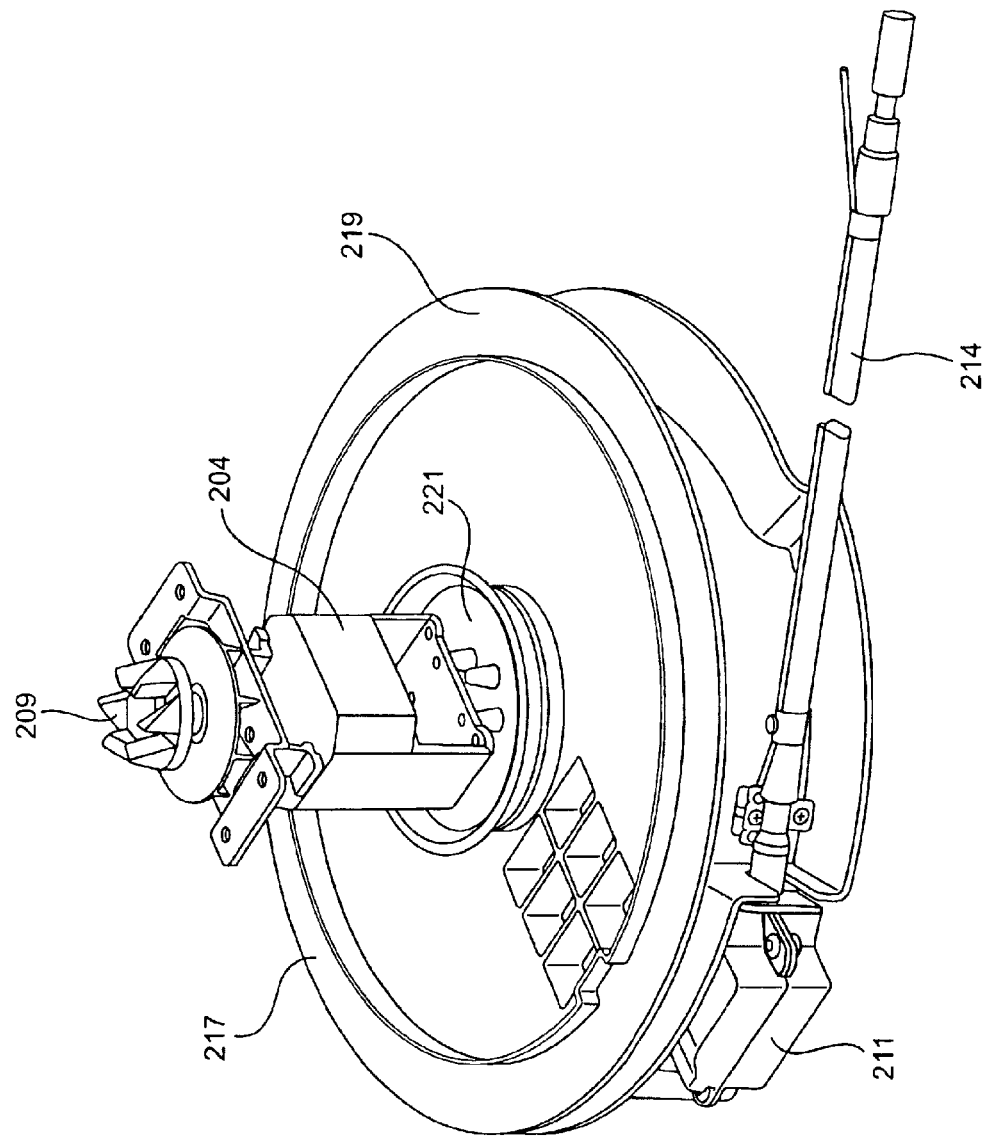
FIG. 11a is a top perspective view of selected internal components of the modular appliance system shown in FIGS. 9 and 10.
Figure 11B:
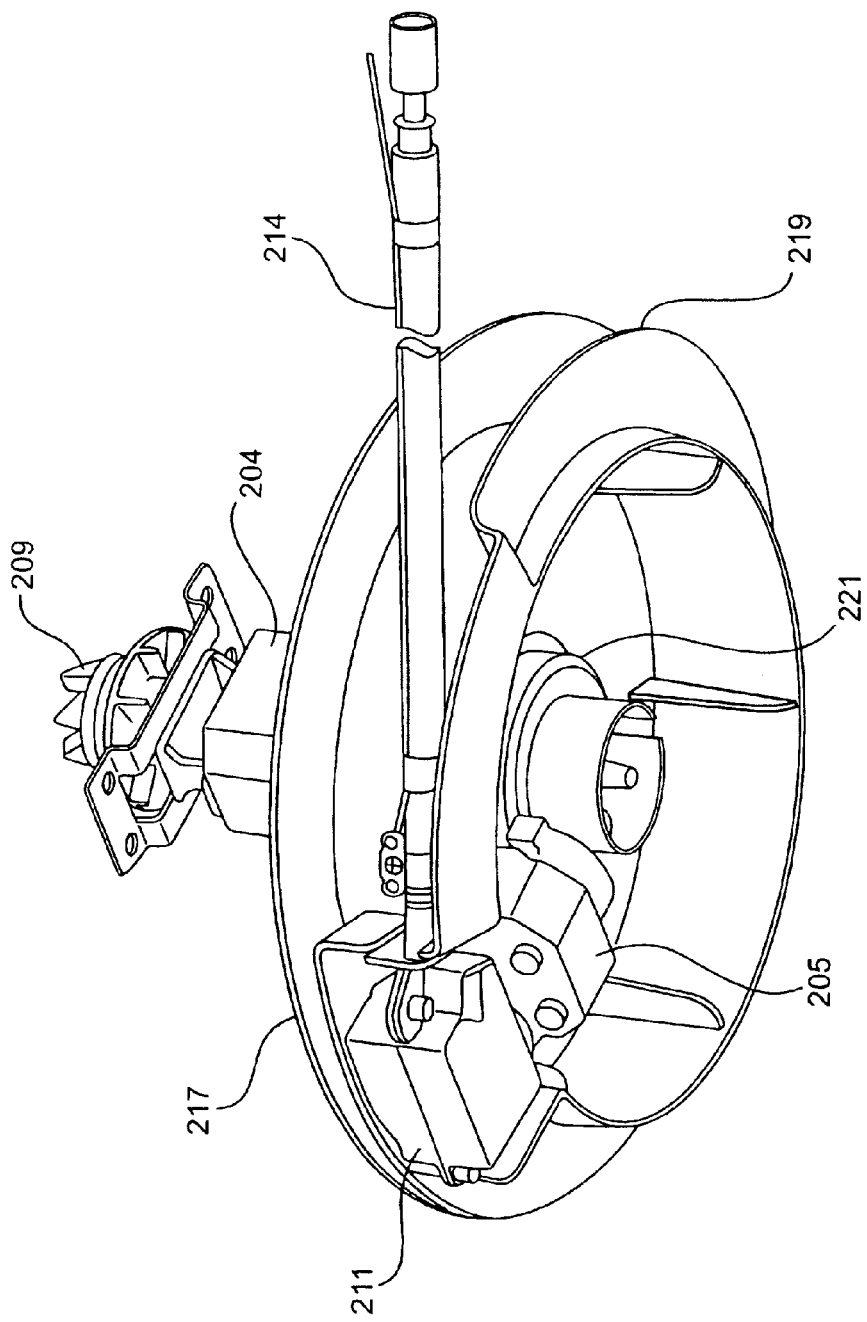
FIG. 11b is a bottom perspective view of selected internal components of the modular appliance system shown in FIGS. 9 and 10.

Also, referring additionally to FIGS. 11a and 11b, the system 200 shown in FIGS. 9 and 10 includes both a direct drive motor 204, for driving the blade assembly 207 of the vessel 206 (or other base appliance) via a motor coupling 209, as described above, and a cable drive motor 205, for driving a flex shaft drive cable 214 via a gear box cable coupling 211, which translates rotary motion from the cable drive motor 205 to the shaft of the drive cable. The use of two motors eliminates the need for an indexing device, as described above, thereby simplifying the required gearing within the base 202. Again, both motors 204 and 205 are preferably speed controlled for selectively driving all accessories designed for use with the system. Also, the direct drive motor 204 for the system 200 is more centrally located within the base 202 and the cable drive motor 205 is located adjacent the flex shaft drive cable compartment.

The flex shaft drive cable 214 of the system 200 has an accessory coupling 216 similar to that described above. A storage compartment (not shown in FIGS. 9 and 10) is located beneath, or otherwise adjacent to, the cable drive motor 205 for storing the drive cable 214 in a coiled retracted position. One end of the drive cable 214 is coupled to the cable drive motor 205 via the coupling 211, while the accessory coupling 216 can be selectively coupled to an appliance 210 for imparting rotary motion to the drive shaft of such appliance.

The cable storage compartment is preferably provided with a spring-biased cable retraction mechanism 217 for alternately feeding and retracting the drive cable 214 to desired lengths (e.g., up to four feet). Such spring-biased retraction mechanisms are known in the art (e.g., rolled tape measures). In particular, referring to FIGS. 11a and 11b, drive cable 214 may be wound on a spool 219, which rotates under the influence of a spring biasing assembly 221 contained within the hub of the spool. Cable drive motor 205 may be mounted to the bottom of spool 219 and rotated therewith, while direct drive motor 204 may be mounted to the top of the spool. As discussed above, cable drive motor 205, acting though the gear box coupling 211 engages the end of the drive cable shaft and causes rotation of the drive cable shaft.

Returning to FIG. 9, to facilitate retraction of the drive cable 214, the base 202 is preferably provided with a drive cable retraction button 218, which, when pressed, causes the retraction mechanism 217 to retract the drive cable 214 onto the spool 219 in the cable storage compartment. The pushing of the retraction button 218 may also activate an interlock switch (not shown) which interrupts power to the cable drive motor 205 rotating the drive cable 214. This prevents the drive cable from rotating and any attached appliance 210 from operating while drive cable 218 is not secured.

Additionally, at the opening for the drive cable 214, the base 202 is preferably provided with a wiper bushing 220 for cleaning or wiping any debris from the drive cable as the cable is retracted into the base. The wiper bushing 220 is designed to be in close fitting relation to the cable 214 to sufficiently clean the entire radial surface of the cable as it is retracted.

The system 200 allows the direct drive motor 204 to directly drive the blade assembly 207 or the like provided in the vessel 206. The motor coupling 209 of the direct rive motor 204 extends through the top surface of the base 202 for engaging the blade assembly 207, as described above. The coupling 209 rotates upon operation of the direct drive motor 204, thereby driving the blades of the blade assembly 207. The cable drive motor 205, on the other hand, is connected to and drives the flex shaft drive cable 214 via the gear box coupling 211 for imparting rotary motion to a hand-held appliance 210. While the system 200 can be constructed such that the blade assembly 207 in the vessel 206 and an appliance 210 attached to the coupling 216 at the end of the drive cable 214 can be operated simultaneously, the preferred embodiment allows only one to be operated at a given time. Accordingly, a toggle switch 222 is provided on the base 202 that allows the user to switch between the direct drive motor 204 and the cable drive motor 205 so that only one appliance is operated at any one time.

Figure 12:
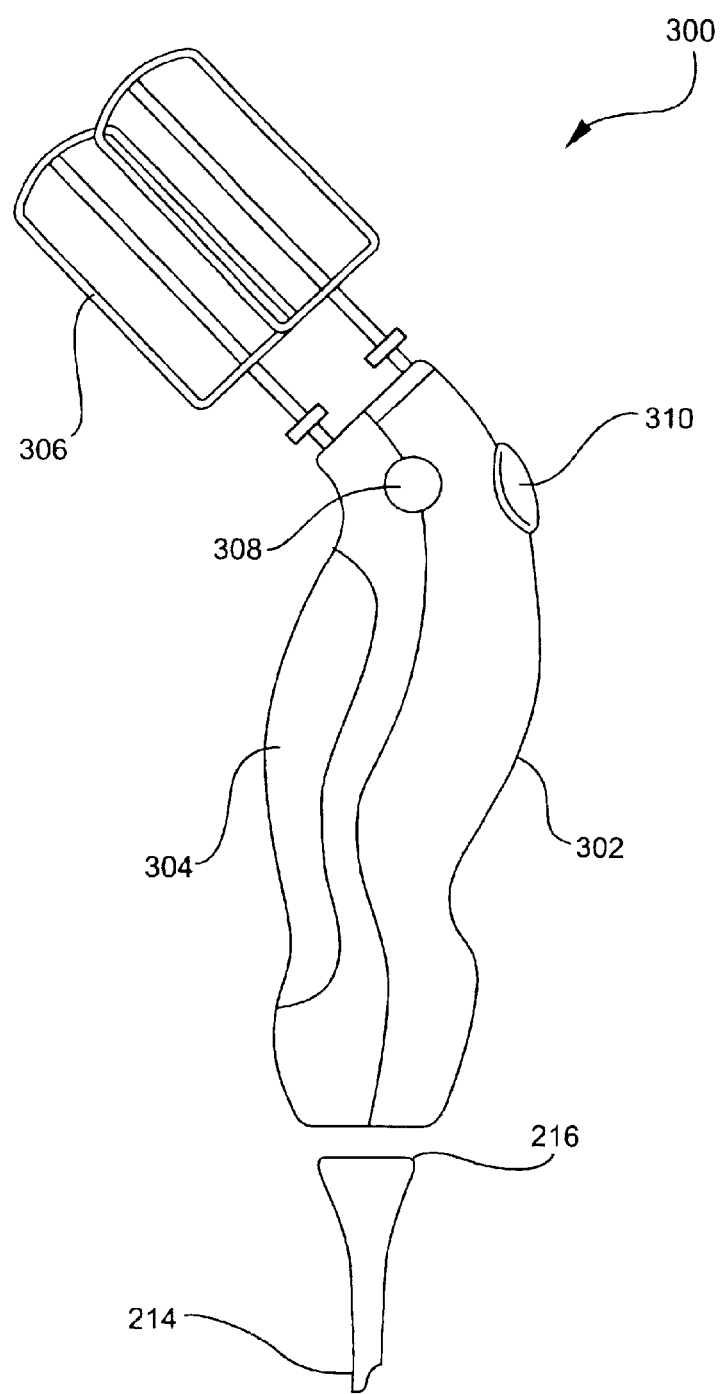
FIG. 12 is a side elevation view of an alternative embodiment of a beater/mixer similar to that shown in FIG. 6.

Referring now to FIG. 12, an alternative embodiment of a beater/mixer appliance 300 is shown. The beater/mixer appliance 300 includes a handle 302 designed for connection to the coupling 216 at the output end of the drive cable 214. A non-slip material 304, including ridges or bumps to facilitate gripping, is preferably provided on the handle 302. The appliance 300 further includes a beater/mixer attachment 306 removably attached to the handle 302 and a button 308 provided on the handle for releasing a locking mechanism (not shown) that locks the beater/mixer 306 to the handle. Rotation of the flexible shaft of the drive cable 214 causes rotation of the beater/mixer 306.

However, unlike the beater/mixer appliance 50 shown in FIG. 6, the beater/mixer appliance 300 shown in FIG. 11 includes a power control button 310 for activating the drive cable 214 from the remote appliance 300 as opposed to, or in addition to, activating the appliance with the base switch 222. Such power control button 310 can operate similar to that described above, wherein power to the appliance can be temporarily terminated and restored.

Figure 13:
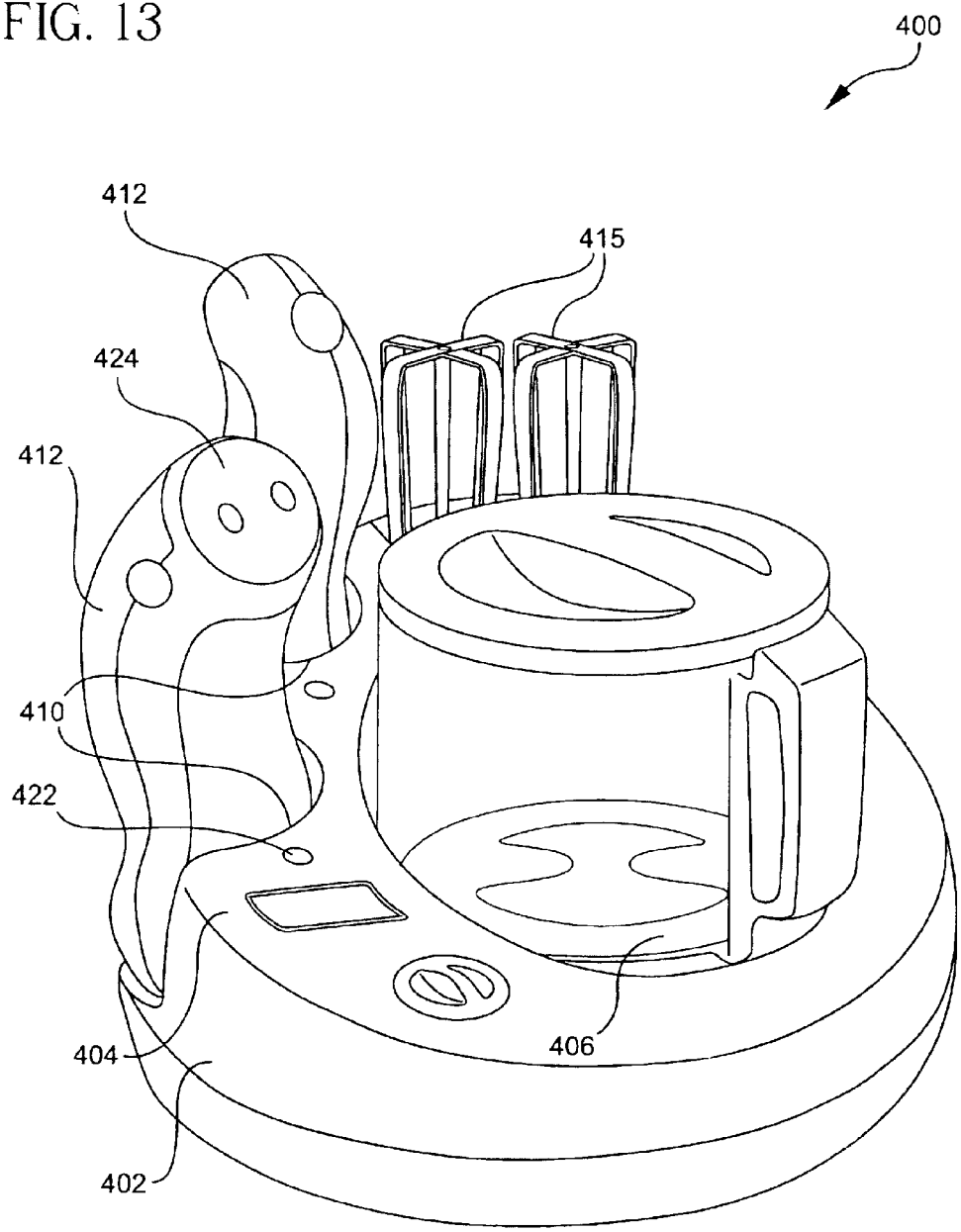
FIG. 13 is a top perspective view showing a modular appliance system in accordance with a further alternative embodiment of the invention.

FIG. 13 illustrates a further alternative preferred embodiment of a modular appliance system 400 formed in accordance with the present invention. This embodiment is similar to the system 200 described above and includes a base 402 including an upper surface 404 adapted to support a vessel 406. Vessel 406 may include a blade assembly 408, which can be in the form of a coffee grinder, blender jar, food processor, etc. The upper surface 404 may also include one or more receptacles 410 for storing one or more handheld appliances 412 and attachments therefore. However, in contrast to the system 200 described above, appliances 412, which are stored on base 12, are operated without the use of a flexible shaft drive cable. In this embodiment, each of appliances 412 may be operated by their own drive assembly and power source, such as a rechargeable battery or batteries, located on the hand-held appliances themselves. The batteries would be recharged when the appliances are places within base 402.

Figure 14:
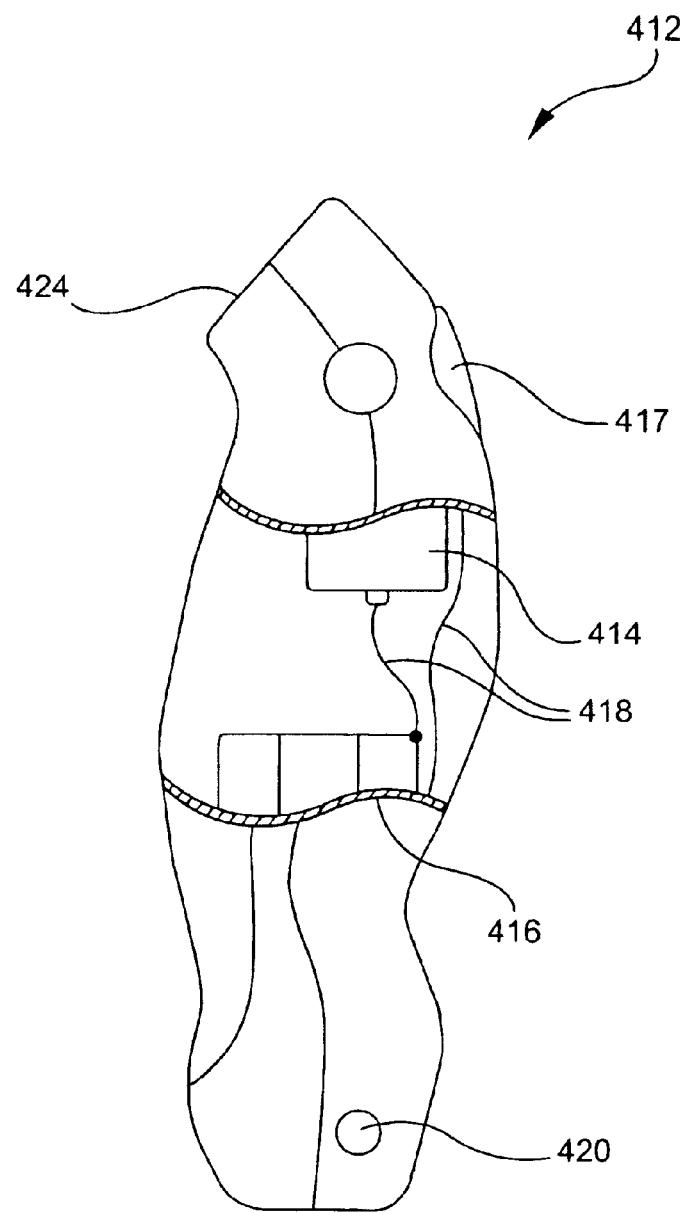
FIG. 14 is a side elevation view of a further alternative embodiment of a beater/mixer with a portion cut away for clarity.

Referring additionally to FIG. 14, hand-held appliances 412 may each include a drive assembly including a motor 414 for imparting the rotary motion to the appliance attachment 415. Motor 414 may be operably connected to batteries 416 and operating switch 417 by wires 418. Actuation of the operating switch 417 by a user selectively turns the motor 414 on and off to start and stop rotation of the accessory attached to the appliance 412. When an appliance 412 is placed within the base receptacle 410, contacts 420 on appliance 412 engage electrical contacts (not shown) located within the receptacle 410. This electrical connection between the hand-held appliance 412 and the base 402 permits a charging current to be transmitted from the base to the appliance when the appliance is placed within the base. The base 402 may include a charging circuit of a type known in the art for charging appliance rechargeable batteries 416. The charging circuit may include an indicator, such as a light 422 for each appliance 412 to alert a user when the batteries in the appliances are fully recharged. Such an indicator may alternatively be located on the appliances themselves.

When only one appliance 412 is provided, the present invention contemplates that the hand-held appliance 412 can connect to a variety of accessory attachments. Such accessories may include, for example, a beater, immersion blender, can opener, scrub brush, etc. Thus, the face 424 of the hand-held appliance 412 may be adapted to removably retain various accessories. This embodiment allows a user to take hand-held appliances 412 to locations remote from the base 402 unrestricted by a connecting drive cable. In addition, when more than one hand-held appliance 412 is supplied, each appliance 412 may be used simultaneously as they are operated under their own power.

Figure 15:
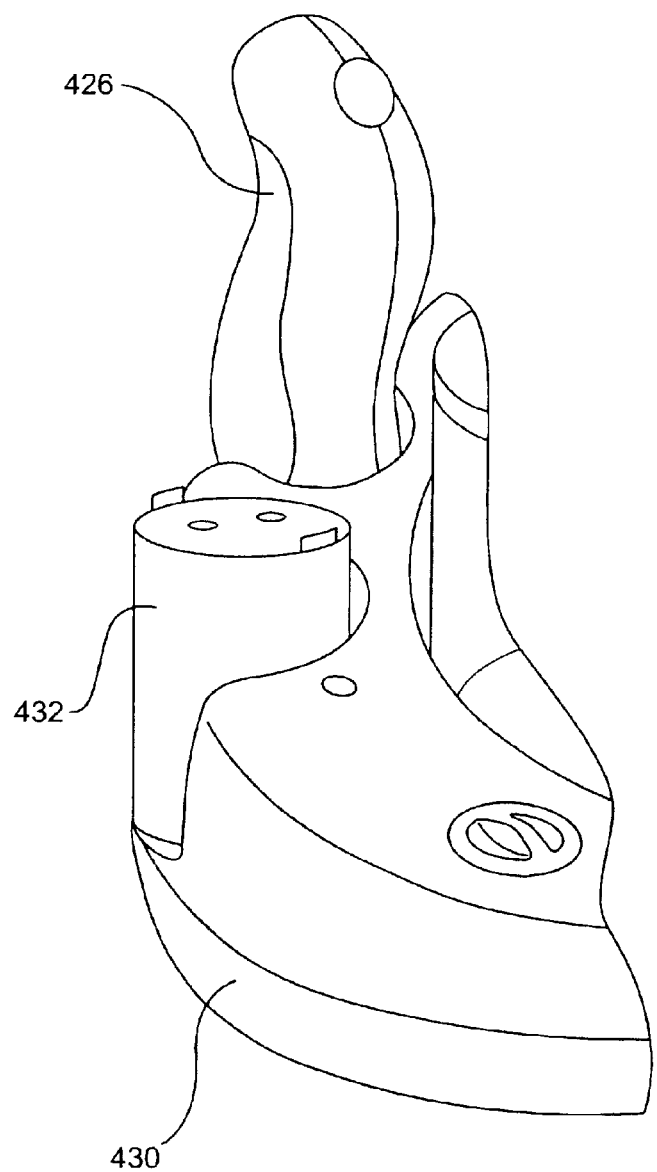
FIG. 15 is a partial top perspective view showing a power module inserted in a base of the modular appliance system.
Figure 16:
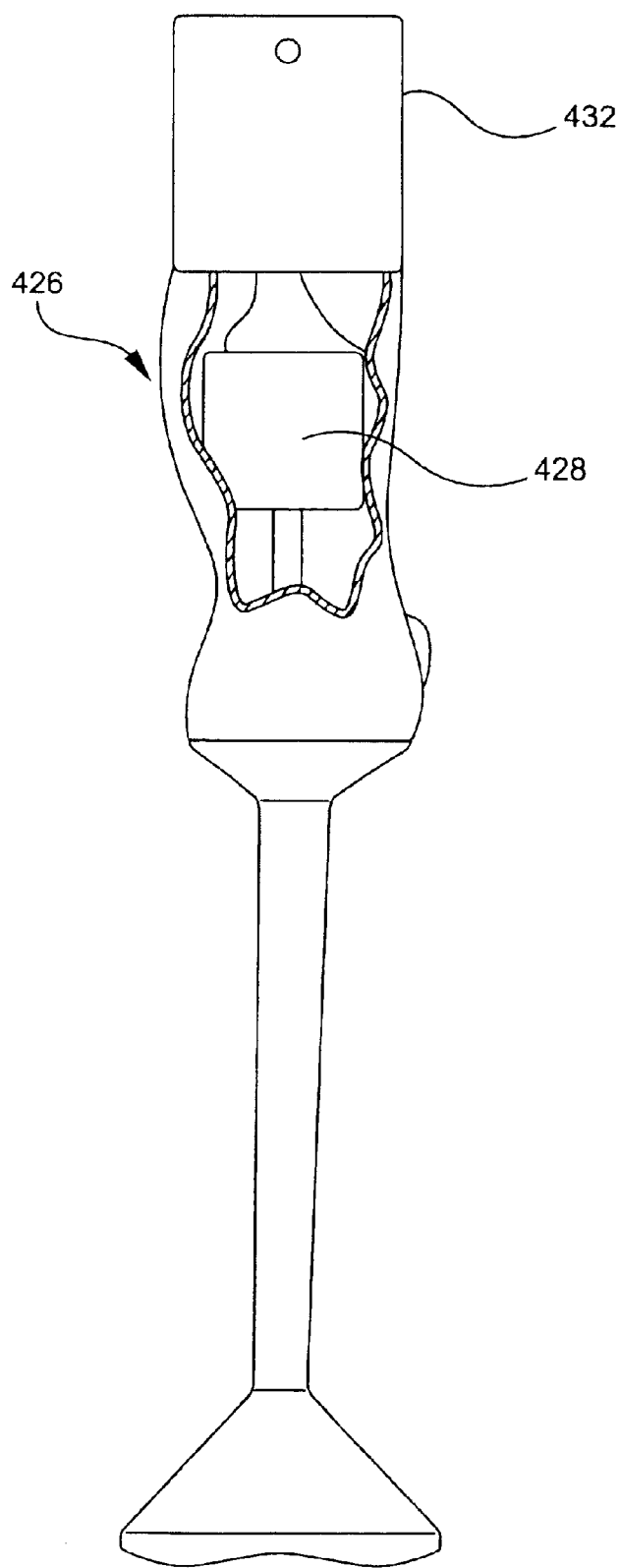
FIG. 16 is a side elevation view of a further alternative embodiment of a beater/mixer with a portion cut away for clarity.

Referring now to FIGS. 15 and 16, the present invention further contemplates that each hand-held appliance 426 may have a dedicated function such as a blender or mixer. The appliance 426 may include its own drive assembly 428 including a motor. As in the previous embodiments, the hand-held accessory 426 would be removably retained in a base 430 similar to that previously disclosed. However, each hand-held appliance 426 would not include its own power source. Instead, each appliance 426 may be selectively attachable to a power module 432 which would energize the drive assembly 428 as shown in FIG. 16. The power module 432 may include a rechargeable battery pack that is removably secured in the base 432 as shown in FIG. 15. The power module 432 would be in electrical contact with a charging circuit in the base 430 such that it may be recharged while not in use.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A modular kitchen appliance system comprising:
   a base having a first receptacle and a second receptacle formed in a top surface of said base;
   at least a first motor contained within said base;
   a vessel supported in said first receptacle of said base, said vessel including a blade assembly adapted for coupling to said first motor;

a hand-held appliance removably supported in said second receptacle of said base, said appliance having a first end for receiving a shaft of an appliance attachment; and a flexible drive cable defining a first end, a second end and a longitudinal axis, said second end being received by a second end of said hand-held appliance and being securable to said shaft of said appliance attachment for imparting a rotary motion to said appliance attachment.

2. A modular kitchen appliance system as defined in claim 1, wherein said first end of said flexible drive cable is coupled to said first motor, said first motor pivoting said flexible drive cable with respect to said longitudinal axis thereby imparting said rotary motion to said appliance attachment.

3. A modular kitchen appliance system as defined in claim 1, further comprising a second motor contained within said base, wherein said first end of said flexible drive cable is coupled to said second motor, said second motor pivoting said flexible drive cable with respect to said longitudinal axis thereby imparting said rotary motion to said appliance attachment.

4. A modular kitchen appliance system as defined in claim 1, wherein said base further includes an interior storage compartment for storing said flexible drive cable in a coiled retracted position.

5. A modular kitchen appliance system as defined in claim 4, wherein said interior storage compartment is provided with a cable retraction mechanism for alternately feeding and retracting the flexible drive cable to desired lengths outside of said base.

6. A modular kitchen appliance system as defined in claim 5, wherein said base includes a cable retraction button for activating said cable retraction mechanism.

7. A modular kitchen appliance system as defined in claim 4, wherein said interior storage compartment defines an opening in said base through which said flexible drive cable may be withdrawn and retracted, said storage compartment including a wiper bushing disposed in said opening for cleaning debris from said flexible drive cable during retraction of said cable into said interior storage compartment.

8. A modular kitchen appliance system as defined in claim 3, wherein said base includes a toggle switch for switching between said first and second motors.

9. A modular kitchen appliance system as defined in claim 1, wherein said hand-held appliance includes a handle having a first button for releasing said appliance attachment from said first end of said appliance and a second button for alternately starting and stopping said rotary motion imparted on said appliance attachment by said flexible drive cable.

10. A modular kitchen appliance system comprising:

a base having a first receptacle and a second receptacle formed in a top surface of said base;

at least a first motor contained within said base;

a vessel supported in said first receptacle of said base, said vessel including a blade assembly adapted for coupling to said first motor;

a hand-held appliance removably supported in said second receptacle of said base, said appliance having a first end for receiving a shaft of an appliance attachment; and an appliance attachment including a shaft adapted to be removably received in said first end of said appliance, and wherein said base includes a third receptacle formed in said top surface thereof for supporting said appliance attachment.

11. A modular kitchen appliance system comprising:

a base having a first receptacle and a second receptacle formed in a top surface of said base;

at least a first motor contained within said base;

a vessel supported in said first receptacle of said base, said vessel including a blade assembly adapted for coupling to said first motor; and a hand-held appliance removably supported in said second receptacle of said base, said appliance having a first end for receiving a shaft of an appliance attachment, and wherein said hand-held appliance includes a second motor contained therein for imparting a rotary motion to said appliance attachment.

12. A modular kitchen appliance system as defined in claim 11, wherein said hand-held appliance includes a power source for powering said second motor.

13. A modular kitchen appliance system as defined in claim 12, wherein said power source is a rechargeable battery.

14. A modular kitchen appliance system as defined in claim 12, wherein said base further includes a battery charging circuit contained therein, and said battery of said hand-held appliance being recharged by said battery charging circuit when said appliance is supported in said second receptacle of said base.

15. A modular kitchen appliance system comprising:

a base having a first receptacle and a second receptacle formed in a top surface of said base;

at least a first motor contained within said base;

a vessel supported in said first receptacle of said base, said vessel including a blade assembly adapted for coupling to said first motor; and a hand-held appliance removably supported in said second receptacle of said base, said appliance having a first end for receiving a shaft of an appliance attachment, said hand-held appliance housing a drive assembly and a power source and said appliance being in electrical communication with said base, and wherein said drive assembly includes a motor and said power source includes a battery.

16. A modular kitchen appliance system as defined in claim 15, wherein said base further includes a battery charging circuit contained therein, and said battery of said hand-held appliance being recharged by said battery charging circuit when said appliance is supported in said second receptacle of said base.

* * * * *